Oct. 6, 1925.

H. THOENI

PLANT SUPPORT

Filed Aug. 25, 1923　　2 Sheets-Sheet 1

Inventor
H. Thoeni
By
Attorney

Oct. 6, 1925.  
H. THOENI  
1,556,373  
PLANT SUPPORT  
Filed Aug. 25, 1923 2 Sheets-Sheet 2

Inventor  
H. Thoeni.  
By [signature]  
Attorney

Patented Oct. 6, 1925.

1,556,373

UNITED STATES PATENT OFFICE.

HERMAN THOENI, OF SPOKANE, WASHINGTON.

PLANT SUPPORT.

Application filed August 25, 1923. Serial No. 659,378.

*To all whom it may concern:*

Be it known that I, HERMAN THOENI, a citizen of the United States, residing at Spokane, in the county of Spokane and State of Washington, have invented certain new and useful Improvements in Plant Supports; and I do hereby declare the following to be a full, clear, and exact description of the invention, such as will enable others skilled in the art to which it appertains to make and use the same.

This invention relates to a plant support.

It is aimed to provide a novel construction which will to better advantage support plants in a sightly and efficient manner, and which at the same time is generally improved and inexpensive from a manufacturing standpoint.

It is particularly aimed to provide a construction which has an anchoring rod adapted for support in the ground substantially centrally of the plant and which has means above its base to engage the foliage and flowers, to the end that the support will not obstruct the use of lawn mowers or the like when used on adjacent grass or sod.

Another object is to provide a construction which has means to particularly support the high blossoms or flowers, usually the center blossoms or flowers, independently of the lower blossoms or flowers, and with said means preferably adjustable as to height.

Still another object is to provide a construction having a stabilizing frame which is provided with means to receive the stems or blossoms so as to prevent undue movement thereof on the part of the wind.

It is further aimed to provide a construction having novel stabilizing frames and means to secure them to the anchoring rods.

Additional objects and advantages will become apparent from a consideration of the description following taken in connection with the accompanying drawings illustrating an operative embodiment.

In said drawings:—

Figure 3 is a perspective view of the main section of said form;

Figure 4 is a perspective view of the extension section for said form; and

Like reference characters designate like or similar parts in the different views.

Figure 1:
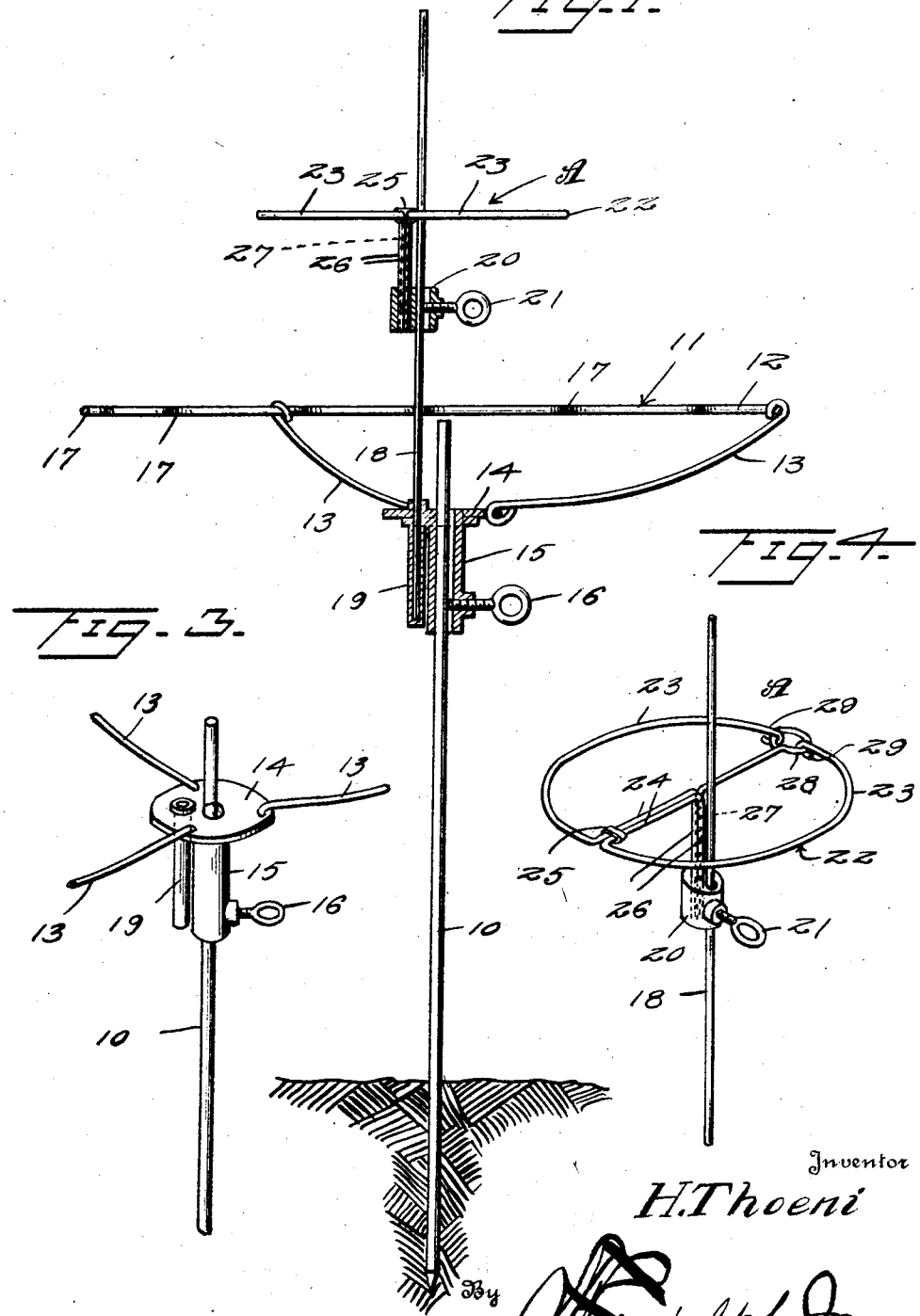
Figure 1 is a view showing one form of the invention in substantially central vertical section.
Figure 2:
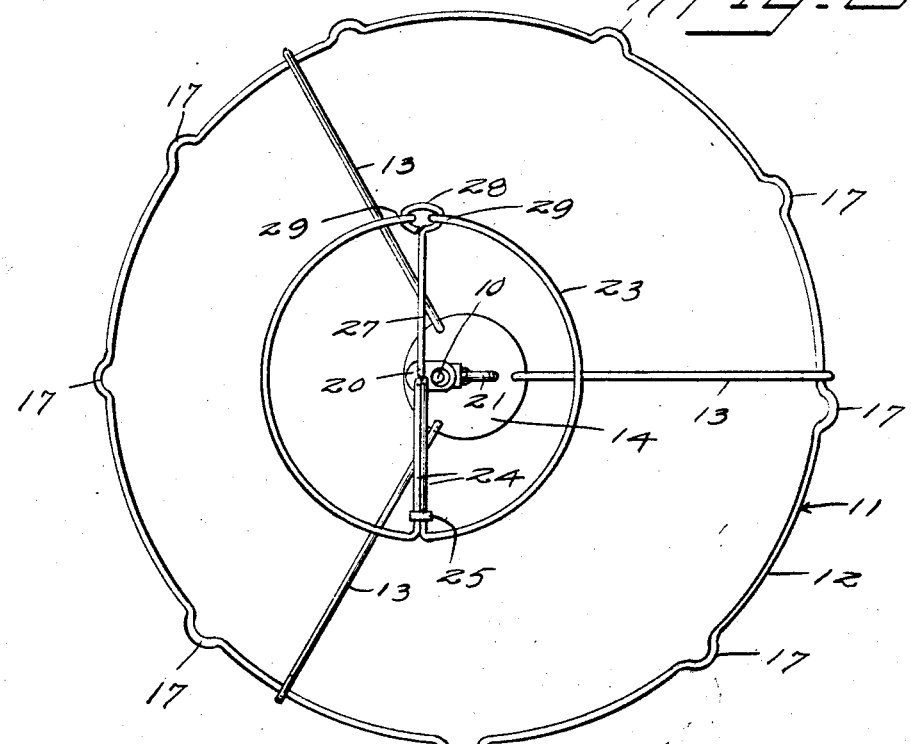
Figure 2 is a plan view thereof.

Referring first to the form of Figures 1 to 4, a metallic or other anchoring rod 10 is provided which is adapted to be driven into the ground, preferably adjacent the center of the plant or plants to be supported. Such rod may even pass through the root of the plant since I have found that no harm will result from their penetration by the rod.

Vertically adjustable on such rod 10 is a supporting and stabilizing frame 11 for the plant or plants. This frame may have an endless ring 12 connected by spokes 13 with a flange 14 extending laterally or horizontally from a hub or sleeve 15. Hub 15 is directly slidable on the rod 10 and may be fastened thereto in any adjusted position, according to the height of the plant, its flowers or its blooms, and for instance by means of a screw 16 threaded in the hub 15 and adapted for binding engagement against said rod 10. The parts of the frame 11 are preferably made of suitable metal.

The foliage and blooms of the plant or vegetation are adapted to be surrounded by the ring 12 and be supported and stabilized thereby. Such foliage and plant and blooms are further stabilized by the spokes 13 and still further by outwardly deflected crooks 17, of the ring 12, forming notches, into which the stalks of the blooms may extend and be supported or held against movement circumferentially of the frame 12.

The aforesaid device may be made in any desired size so as to be capable of supporting plants of various kinds. In the cases of tall plants, however, and such for instance as peonies, large larkspur plants, foxgloves, chrysanthemums and the like, an extension or center bloom support A is preferably used. The support A consists of a supporting rod 18 adapted to be slidably and removably disposed in a socket or holder 19 carried by the hub 15.

Along the rod 18, a sleeve or clamp 20 is slidably disposed, being adapted to be fastened in different vertical adjusted positions by means of a set screw 21 carried thereby, and adapted for direct binding engagement with rod 18. The center blooms of plants of the types specifically referred to are usually taller than the remainder, and to this end, a sleeve or clamp 20 carries an endless stabilizing and supporting frame 22. Frame 22 consists of arcuate, substantially semicircular arms 23 which have inwardly extending portions 24, secured together as by a clip 25, and which portions have depending shanks 26 directly fastened to the clamp 20. A fastening arm 27 rises from the clamp 20 and has an outwardly extending portion substantially in line with the portion 24 and terminating in an eyelet 28 at its distal end. The distal ends of the arms 23 terminate in hooks 29 adapted for detachable engagement with the eyelet 28 as shown. The parts of the center bloom extension or attachment like those of the main section of the device are of suitable metal and the arms 23 are preferably of resilient wire so that they may yield to engage and disengage the eyelet 28 and hooks 29. The center bloom or adjacent foliage is received within the arms 23, while the latter are preferably detached from the eyelet 28 to accommodate their reception and after which such arms by means of the hooks 29 are fastened to the eyelet 28. Thus the center bloom and adjacent foliage will be supported, surrounded and stabilized by the arms 23 and portions 24 and arm 27. The crooks 17 may be provided in the arms 23 if desired.

Figure 5:
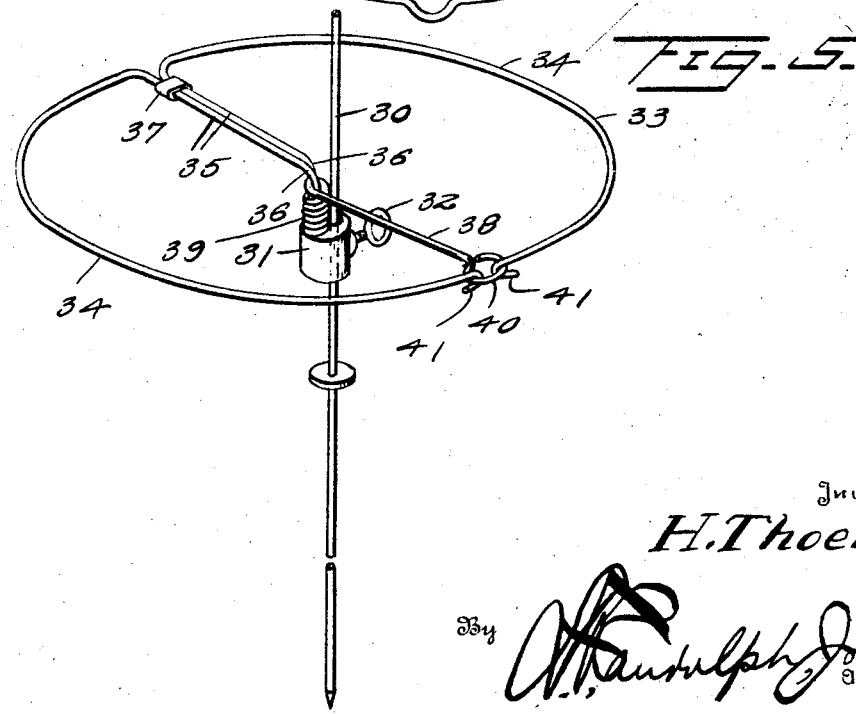
Figure 5 is a perspective view of a second form.

In Figure 5 a second modified form is shown which is particularly adapted for use with small plants or vegetation and for instance strawberry plants. This form includes an anchoring rod 30 adapted to be driven into the ground substantially centrally of the plant and along the rod and vertically adjustable is a slidable clamp or sleeve 31 adapted to be secured in its different adjusted positions by a set screw 32 threaded thereto and adapted to bind against the rod 30. This form also uses an endless supporting and stabilizing frame as at 33 which may consist of resilient, substantially semicircular arms 34 having inwardly extending securing portions 35 from which shanks 36 depend and which are fastened to the clamp. Portions 35 may be secured together by a clip at 37. A fastening arm 38 extends from the clamp and may be secured thereto by coiling its inner end portion as at 39 about the shank 36. Arm 38 at its distal end has an eyelet 40 adapted to be detachably engaged by hooks 41 at the distal ends of the arms 34. The parts in this form like in the previous form are preferably made of metal and the arms 34 are resilient so that the hook 41 may engage and disengage the eyelet 40. The strawberry bushes and fruit are adapted to be surrounded by the frame 33 and supported and stabilized by the arms 34 and portions 35 and arm 38. The plant and its fruit may be received within the frame when the hooks 41 are detached from eyelet 40. It will thus be seen that the present form of the invention is essentially the same as the center bloom attachment A, aside from the fastening of arm 38 by means of coils 39. These coils 39 aside from attaching the arm 38 also resiliently secure it.

Various changes in the details may be resorted to provided they fall within the spirit and scope of the invention.

I claim as my invention:—

1. A plant support including a supporting rod, a clamp adjustably mounted on said rod, plant supporting arms carried by said clamp and formed to extend in opposite directions and provided with hooked extremities, and a fastening arm carried by said clamp and provided with an eye to engage said hooks.

2. A plant support consisting of arms adapted to surround a plant, a fastening arm having an eyelet, and the first mentioned arms having hooks detachably engageable with said eyelets, securing portions for said arms, a clamp from which said securing arm and securing portions extend, and supporting means engageable by said clamp.

In testimony whereof I affix my signature.

HERMAN THOENI.